US006976403B2

(12) United States Patent  
Oblizajek et al.

(10) Patent No.: US 6,976,403 B2  
(45) Date of Patent: Dec. 20, 2005

(54) STEERING WHEEL DYNAMIC ABSORBER ASSEMBLY

(75) Inventors: Kenneth L. Oblizajek, Troy, MI (US); Carl T. Wright, Highland, MI (US)

(73) Assignee: General Motors Corporation, Detroit, MI (US)

( * ) Notice: Subject to any disclaimer, the term of this patent is extended or adjusted under 35 U.S.C. 154(b) by 25 days.

(21) Appl. No.: 10/242,961

(22) Filed: Sep. 13, 2002

(65) Prior Publication Data

US 2004/0050203 A1 Mar. 18, 2004

(51) Int. Cl.$^7$ .............................. B62D 1/04; G05G 1/10
(52) U.S. Cl. ........................................ 74/552; 74/558
(58) Field of Search ................... 74/552, 558, 490, 74/473.29, 558.5; 29/894.1; 152/87; 280/731, 777; 180/443, 400

(56) References Cited

U.S. PATENT DOCUMENTS

| 5,868,041 A | * | 2/1999 | Suzuki | 74/552 |
| 6,494,114 B1 | * | 12/2002 | Schuler | 74/558 |
| 6,499,377 B1 | * | 12/2002 | Schuler | 74/558 |
| 2002/0023517 A1 | * | 2/2002 | Ochiai et al. | 74/552 |
| 2003/0196737 A1 | * | 10/2003 | Kimura | 152/87 |
| 2003/0233905 A1 | * | 12/2003 | Bostick et al. | 74/552 |

FOREIGN PATENT DOCUMENTS

WO    WO 03/016003 A1 * 2/2003 ................. 74/552

OTHER PUBLICATIONS

Shock and Vibration Handbook, Third Edition, Cyril M. Harris, McGraw–Hill Book Company, ISBN 0–07–026801–0, 1988, Chapter 6 Dynamic Vibration Absorbers and Auxilary Mass Dampers, pp 6–1 to 6–38.

Shock and Vibration Handbook, Third Edition, Cyril M. Harris, McGraw–Hill Book Company, ISBN 0–07–026801–0, 1988, Chapter 36, pp 36–1 to 36–28, especially p. 36–10 (reference for tan δ).

Sound and Vibration Damping with Polymers, Robert D. Corsaro, L. H. Sperling, ACS Symposium Series 424, American Chemical Society, ISBN 0–8412–1778–5, Chapter 1 Basic Viscoelastic Definition and Concepts, pp 5–12, especially pp 6–8 (reference for tan δ).

(Continued)

*Primary Examiner*—Vinh T. Luong  
(74) *Attorney, Agent, or Firm*—Laura C. Hargitt (57) ABSTRACT

An assembly operable to be used with a steering wheel of a vehicle and to suppress a vibration transmitted to the steering wheel includes a plurality of support flexures and an inertial ring attached to the support flexures. The support flexures are operable to be attached to the steering wheel and the support flexures and the inertial ring are tuned to suppress a vibration at a predetermined band of frequencies. The support flexures and the inertial ring are positioned in an annular cavity formed in the rim.

13 Claims, 6 Drawing Sheets

OTHER PUBLICATIONS

Dynamics of Physical Systems, Robert H. Cannon, Jr., McGraw–Hill Book Company, Lib of Congress Catalog No 65–2521, 1967, Section 15.4 Design for a Single Frequency: The Vibration Absorber pp 525–528.

Fundamentals of Vibrations, Roger A. Anderson, The Macmillan Company, Lib of Congress Catalog No 67–13599, 1967, Section 4.7, Example 4.11 The Vibration Absorber, pp 142–146.

Mechanical Vibrations, $4^{th}$ Edition, J. P. Den Hartog, McGraw–Hill Book Company Inc., New York, 1956, Lib of Congress Catalog No 55–11927, ISBN 07–016389–8, pp 87–106.

Vibration Problems in Engineering, $4^{th}$ Edition, S. Timoshenko, D. H. Young, W. Weaver Jr., John Wiley and Sons, ISBN 0–471–87315–2, 1974, Chapter 3, Section 3.6 Undamped Forced Vibrations, Section 3.7 Free Vibrations with Viscous Damping, Section 3.8 Forced Vibrations with Viscous Damping, pp 259–278.

Vibrations: Theoretical Methods, Yu Chen, Addison–Wesley Publishing Company Inc., Lib of Congress Catalog No 66–12471, 1966, Chapter 5 Section 5.7 The Forced Vibration, pp 134–136.

Dynamic Vibration Absorbers, Dr. J. B. Hunt, Mechanical Engineering Publications Ltd, London, ISBN 0–85298–417–0, 1979.

Mechanical Systems Analysis, Ali Seireg, International Textbook Company, Lib of Congress Catalog No 77–86868, 1969, Chapter 8 Section 8–4 Forced Vibrations, pp 320–325.

* cited by examiner

Steering Wheel Torsional Vibration with 0.0058 kg-m imbalance

FIG - 13B

| $I_r$ | M | $R_o$ | $R_i$ | $R_r$ | T | $f_r$ | $k_r$ | $f_{ty}$ / $f_{tz}$ | $k_{ty}$ / $k_{tz}$ | $I_d$ | $k_p$ | $f_p$ | $f_d$ | $\tan(\delta)$ |
|---|---|---|---|---|---|---|---|---|---|---|---|---|---|---|
| kg-m² | Kg | mm | mm | mm | mm | Hz | N/mm | Hz | N/mm | kg-m² | N/mm | Hz | Hz | — |
| 0.015 | 0.50 | 178 | 172 | 175 | 9.0 | 17 | 1.45 | 278 | 764 | 0.008 | 104 | 145 | 145 | 0.06 |

STEERING WHEEL DYNAMIC ABSORBER ASSEMBLY

BACKGROUND OF THE INVENTION

The present invention relates generally to tuned dynamic absorbers and, in particular, to a steering wheel dynamic absorber assembly.

Tuned dynamic absorbers are well known. These absorbers function by adding a secondary mass or masses via attachment elements with spring-like and damper-like properties to a system having unwanted vibrations. The added mass or masses and attachment elements comprise the tuned dynamic absorber. The natural frequency of the absorber is equal or near that of the unwanted vibration in the original system and, through dynamic actions well known to those skilled in the art, the absorber suppresses unwanted vibrations at narrow frequency bands.

Periodic vibrations in moving vehicles, especially at tire-wheel rotation rates, have become particularly problematic over the last few years. In addition, other annoying vibrations occurring on irregular road surfaces frequently involve vibrations at the steering wheel. Unwanted periodic torsional steering wheel vibrations at the first order of the tire-wheel rotation rate (typically at highway speeds of 50–90 miles per hour), defined as smooth road shake, are prevalent on many vehicles. Other vibrations involving rim motions of the steering wheel, occurring during moving operation or, in the case of powertrain excitation, even stationary idle operation, are likewise annoying and have been observed on certain vehicles. One type of solution for periodic vibrations has been improved quality through component specifications designed to reduce the internal exciters, such as tire and wheel non-uniformity and imbalance tolerances. Other solutions have included dynamic tire and wheel assembly balancing and match mounting of the assembly components, which is the practice of preferentially aligning the relative orientation of the tire on the wheel for minimal net periodic force excitation.

Reducing periodic exciters through ever tightening component tolerances, however, has not been able to eliminate vibrations completely. In addition, vehicle modifications intended to reduce vibratory sensitivity have resulted in compromises in other performance areas, such as steering responsiveness in serpentine or cornering maneuvers.

The use of absorbers to suppress vibrations, in addition to tightening component tolerances, is a common practice by vehicle manufacturers. Specifically, in steering column applications, a common practice is to attach an absorber near the center of rotation of the steering wheel. These types of devices, however, have been used only for suppressing translational or out-of-plane modes of vibration at the steering wheel.

It is desirable, therefore, to utilize a tuned dynamic absorber to provide a cost-effective and relatively lightweight solution for suppressing vibrations at the steering wheel regardless of the mode of the vibration and, in particular, to suppress torsional vibrations of the steering wheel.

SUMMARY OF THE INVENTION

The present invention concerns an assembly operable to be used with the rim of a steering wheel of a vehicle to suppress a vibration transmitted to the steering wheel rim during operation of the vehicle. The present invention can suppress vibration utilizing either a passive assembly embodiment or an active assembly embodiment. In either embodiment, the assembly includes a generally toroidally-shaped body, such as a steering wheel rim, having an annular cavity formed therein. A dynamic mass is disposed in the annular cavity. Preferably, the dynamic mass is an inertial ring extending along the entire length of the annular cavity. Alternatively, the dynamic mass is composed of a plurality of segmental masses along the length of the annular cavity. A plurality of dynamic mass suspension elements having first and second ends are disposed in the annular cavity and attached to the dynamic mass at their respective first ends and to the steering wheel rim at their respective second ends. A plurality of motion limiting members having opposed ends are likewise disposed in the annular cavity and are attached to either or both of the steering wheel rim and the dynamic mass.

The dynamic mass and the dynamic mass suspension elements in a passive assembly function to suppress a vibration transmitted to the steering wheel rim by developing neutralizing or counter-acting forces to those forces otherwise resulting in the vibration of the rim. These desired neutralizing or counter-acting dynamic forces are exerted by the dynamic mass suspension elements on the rim of the steering wheel as the elements undergo deformation from the relative displacements and velocities imposed by the rim and dynamic mass. Those skilled in the art recognize that a preferred combination of elastic and damping or loss properties of the dynamic suspension elements can lead to a substantial and effective reduction in vibration at the rim of the steering wheel over a narrow band of frequencies. Dynamic mass suspension elements that provide elastic or spring-like forces can include, but are not limited to, plastic, elastomeric, magnetic, composite, metallic elements or layered combinations therefrom, as well as pneumatic elements, such as a confined gas chamber. Damping properties either obtained through parasitic contributions, or in the case of insufficient parasitic properties, damping contributions supplemental to that of the resultant damping of the selected elastic element, are likewise obtained from these same elements or others including, but not limited to, plastic, elastomeric, electrical, magnetic, composite, metallic elements or layered combinations therefrom, as well as hydraulic or viscous elements, elements having relative sliding friction between the dynamic mass and steering wheel rim (through coulomb action), and pneumatic elements.

In the operation of a passive assembly, the dynamic mass is responsive to a vibratory force producing vibration of the steering wheel rim. The dynamic mass has a sufficient mass with which to interact with the dynamic mass suspension elements to suppress the expected vibrations at a predetermined band of frequencies. Optionally, motion limiting members are employed to restrict the movement of the dynamic mass relative to the steering wheel rim so as to avoid possible damage to the dynamic mass suspension elements caused by excessive relative displacements.

An active assembly includes the elements of a passive assembly outlined above but further includes active suppression force elements having opposed ends that are disposed in the annular cavity exerting control forces between the dynamic mass and the steering wheel rim. The active suppression force element is attached at one end to the dynamic mass and at the other end to the steering wheel rim. The active suppression force element has the capability to respond to a signal generated in response to a measured steering wheel vibration. The active suppression force element can be an element or device that creates forces through electromagnetic action, piezoelectric action, or a similar type action to produce desirable vibratory forces between the dynamic mass and the steering wheel rim, suppressing the vibrations at the rim of the steering wheel, while allowing the dynamic mass to react these same forces through inertial acceleration.

In the operation of an active assembly, the dynamic mass interacts with the active suppression force element and the passive elements to suppress the vibrations at a predetermined band of frequencies. The active suppression force element provides a sufficient suppression force, such as through an electromagnetic or a piezoelectric action, in response to a measured steering wheel vibration, such as a dynamic torque or acceleration, in order to suppress unwanted steering wheel vibrations. Optionally, motion limiting members are employed to restrict the movement of the dynamic mass relative to the steering wheel rim so as to avoid possible damage to either or both of the dynamic mass suspension elements and the active suppression force elements caused by excessive relative displacements.

In an embodiment, the assembly includes an inertial ring attached to a plurality of support flexures. The support flexures are preferably constructed of a plastic material or similar material exhibiting desirable elastic and damping or loss properties. The assembly is operable to be used with the steering wheel rim and is tuned to suppress a predetermined vibration transmitted to the steering wheel. The embodiment features substantial polar inertia with the relatively low mass of the ring owing to its placement at the radius of the rim, which optimizes the use of added mass and provides the most polar inertia for added mass within the envelope of the steering wheel. This enables mass-effective and cost-effective reductions in torsional vibration of the steering wheel rim.

The present invention advantageously counteracts a vibratory force producing vibrations of the steering wheel rim that, in the prior art, resulted in excessive vibration. The present invention is specifically designed to suppress steering wheel torsional vibrations but is also capable of dynamically suppressing other rim vibrations such as in the radial or axial directions. The present invention, therefore, can be adapted to suppress torsional, lateral, foreaft, and vertical vibrations. Independent tuning of the critical frequencies of the absorber for the respective vibrations is achieved by modification of the mass or masses and support flexures at the attachment points of the assembly to the rim of the steering wheel. The support flexures are preferably plastic or elastomeric, designed with strategically directional properties. Additional tuning is available through modification of the dynamic mass or masses by modifying the amount of mass and its distribution around the circumference of the rim, which is especially effective for asymmetric configurations. The present invention produces a substantial reduction in vibrations over the normal usage speed range of vehicles. The present invention is tuned to the sensitive band of frequencies typical of the target vehicle.

The present invention also advantageously provides an ability to readily incorporate in a vehicle low friction, low lash steering systems, such as rack & pinion steering systems, which offers advantages of economics and steering response, without the trade-offs of increased vibration sensitivities. The present invention also advantageously enables a reduction in costs as compared to other vibration countermeasures that are commonly adopted, such as other types of absorbers, alternative steering systems, and vibration-suppression packages. It is anticipated that the present invention will produce an increase in quality and customer satisfaction by reducing complaints or noticeable problems.

The present invention advantageously provides a novel assembly to suppress smooth road shake, greatly improves the efficiency of added mass in the steering wheel rim to reduce smooth road shake, reduces part cost for items currently needed to suppress smooth road shake, and allows improvements in other vehicle performance areas that may have been compromised with prior art methods for reducing smooth road shake.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
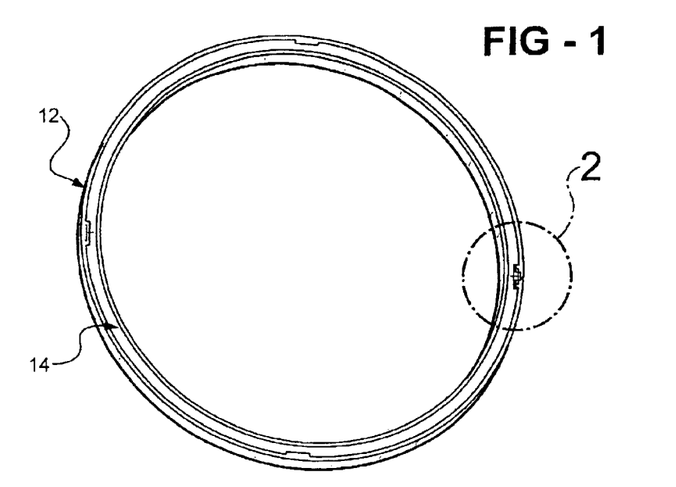
FIG. 1 is a perspective view of a steering wheel rim including an absorber assembly in accordance with the present invention.
Figure 2:
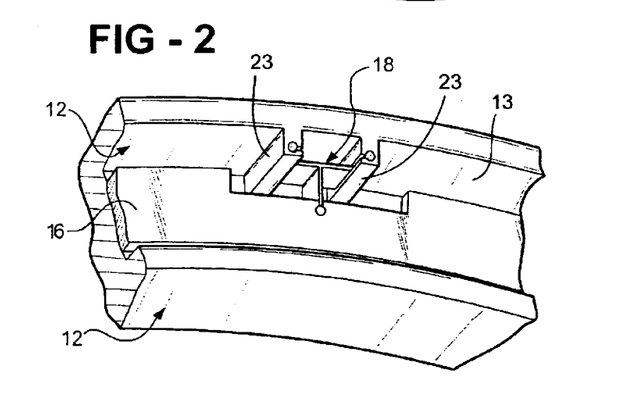
FIG. 2 is an enlarged perspective view of the encircled portion 2 of FIG. 1 with an outer portion of the rim removed.
Figure 3:
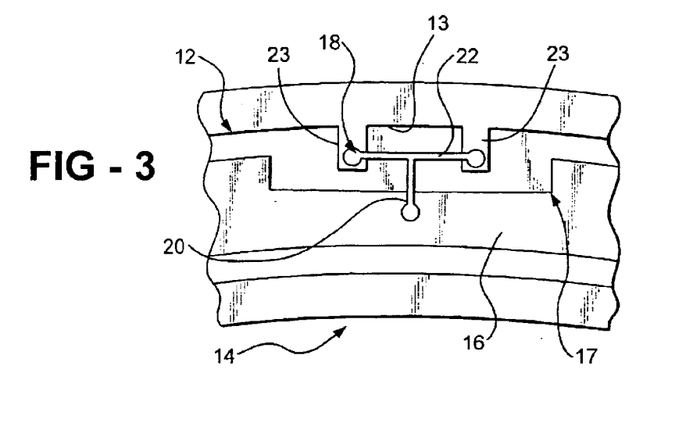
FIG. 3 is a further enlarged view similar to FIG. 2.

Referring now to FIGS. 1, 2, and 3, a generally circular steering wheel rim is indicated generally at 12. The rim 12 is adapted to be incorporated in a steering wheel (not shown) and includes an absorber assembly according to the present invention disposed therein, indicated generally at 14. The steering wheel with the rim 12 is operable to be installed in a vehicle (not shown). The assembly 14 according to the present invention includes an inertial ring 16 that is adapted to be received in a hollow interior of the steering wheel rim 12. The inertial ring 16 is preferably constructed of steel or a similar material. The assembly 14 includes a plurality of support flexures 18 attached to the inertial ring 16. The support flexures 18 are preferably constructed of plastic, elastomeric, composite, metallic elements or layered combinations thereof, or a similar material and are operable to attach the inertial ring 16 to an interior wall 13 of the steering wheel rim 12. Alternatively, the support flexures 18 are constructed of fixtures having layers of elastomeric, plastic, composite and metallic materials that are arranged to provide desirable elastic and damping or loss properties.

The support flexures 18 are preferably T-shaped and include a generally radial member 20 attached to and extending inwardly from a generally tangential member 22. Preferably, the radial member 20 is predominately tuned to enable suppression of torsional vibration transmitted from the vehicle to the steering wheel. Preferably, the tangential member 22 is predominately tuned to suppress translational vibration transmitted from the vehicle to the steering wheel.

During conventional manufacturing of steering wheels, a coating (not shown) formed of foam, leather wraps, plastic coatings or combinations thereof is attached to an exterior surface steering wheel rim 12. Those skilled in the art will appreciate that the inertial ring 16 and support flexures 18 must be protected by a protective cover (not shown) during application of the coating to allow for relative movement between the inertial ring 16 and the steering wheel rim 12, discussed in more detail below.

For exact solutions, the following equations prescribe the required distribution of stiffness properties among the support flexures 18 with four equally disposed support flexures 18.

Figure 6:
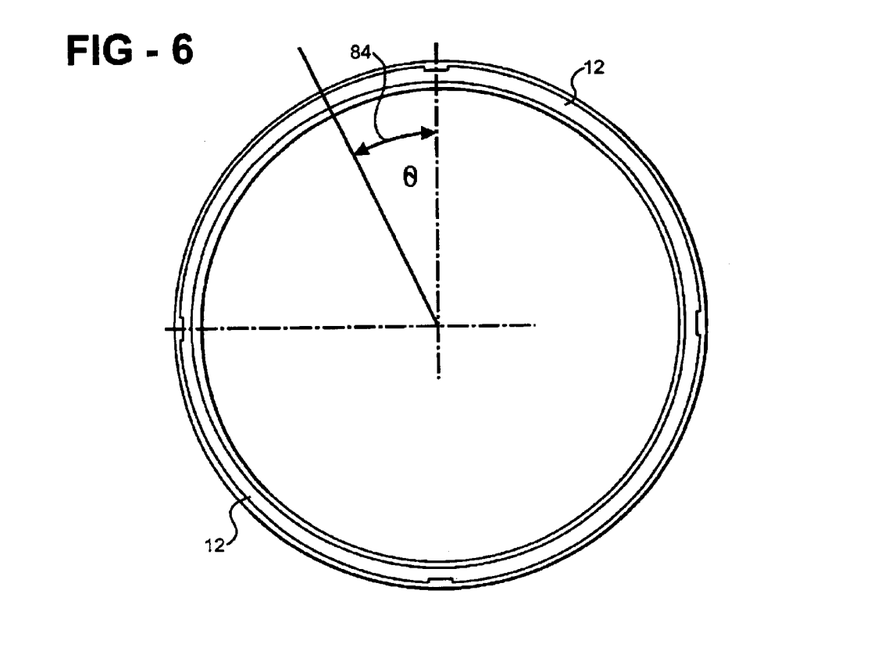
FIG. 6 is a plan view of a steering wheel rim in accordance with the present invention showing a torsional deflection.

Referring now to FIG. 6, in order to suppress a torsional vibration transmitted to the steering wheel rim 12 that deflects the steering wheel rim 12 in an angular direction indicated by an arrow 84, the stiffness of the support flexures 18 must be equal to a value defined by the following equation:

$$k_r = \frac{1}{4} I_r \left(\frac{2\pi f_r}{R_r}\right)^2,$$

where $k_r$=stiffness of the support flexures 18 in the direction tangent to the inertial ring
$f_r$=torsional frequency to suppress, typically 10 to 20 Hz
$R_r$=Radius at which the support flexures act $$I_r = \int r^2 dm = M \frac{R_o^2 + R_i^2}{2} \text{ (for fixed radius ring)},$$

Figure 7:
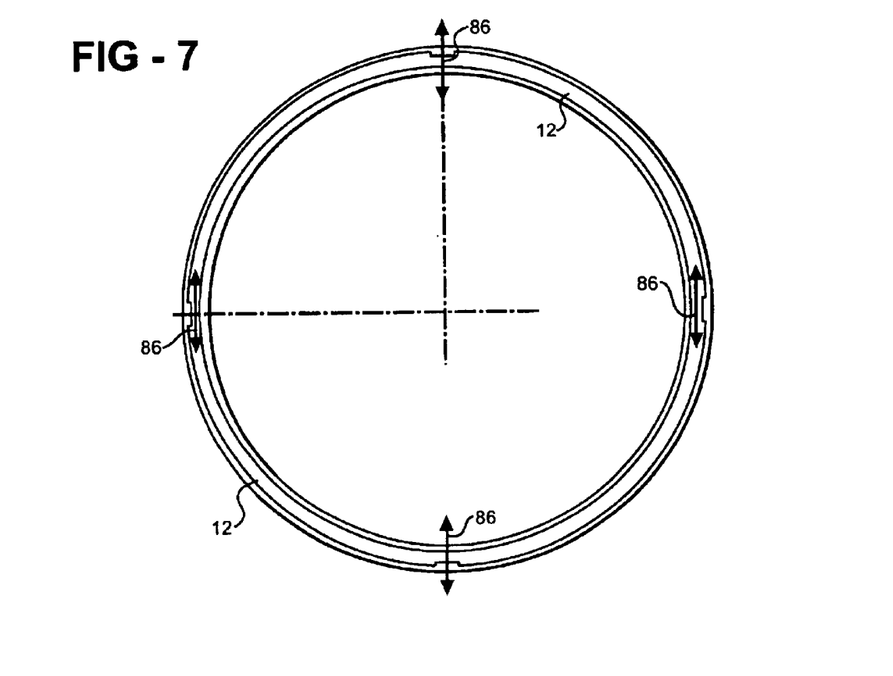
FIG. 7 is a plan view of a steering wheel rim in accordance with the present invention showing a vertical deflection.
Figure 8:
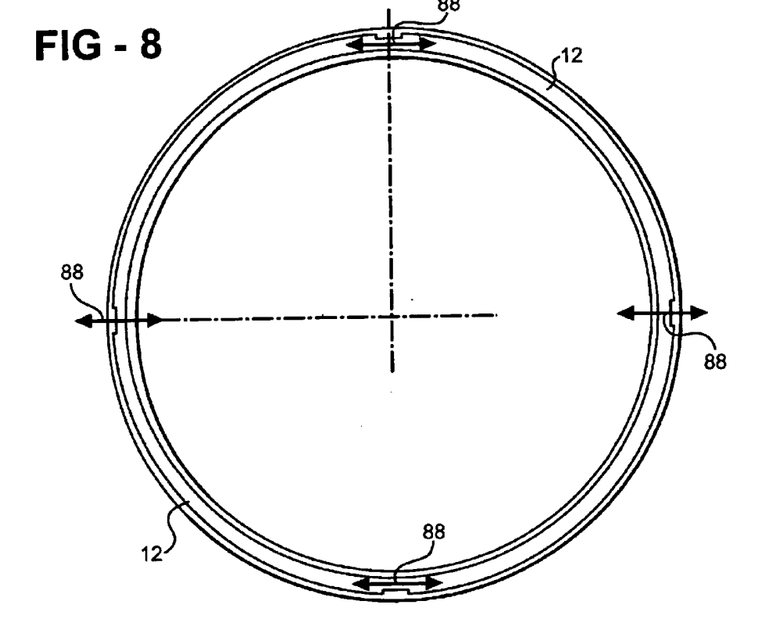
FIG. 8 is a plan view of a steering wheel rim in accordance with the present invention showing a lateral deflection.
Figure 9:
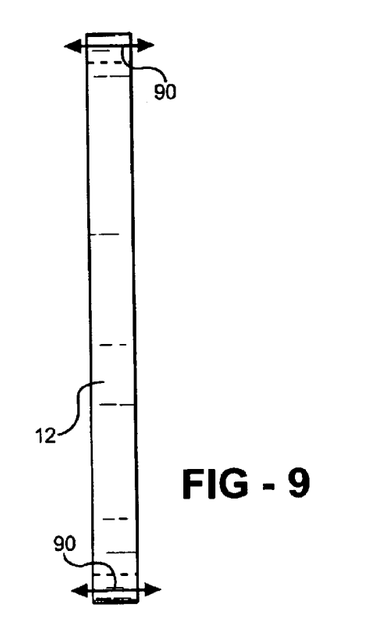
FIG. 9 is a side view of a steering wheel rim in accordance with the present invention showing a fore and aft deflection.
Figure 10:
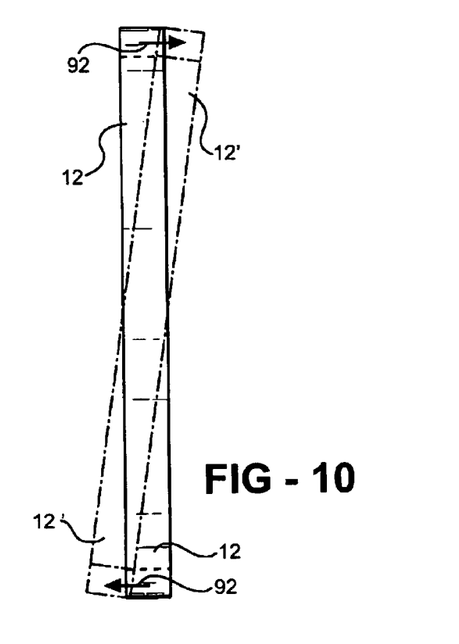
FIG. 10 is a side view of a steering wheel rim in accordance with the present invention showing an out of plane deflection.

(for fixed radius ring),
$I_r$=Polar inertia of the inertial ring about the steering axis
M=Mass of the inertial ring
$R_o$=Outer diameter of the inertial ring
$R_i$=Inner diameter of the inertial ring Referring now to FIG. 7, in order to suppress a vertical vibration transmitted to the steering wheel rim 12 that deflects the steering wheel rim 12 in a vertical direction indicated by arrows 86, the stiffness of the support flexures 18 must be equal to a value defined by the following equation:

$$k_{tz} = \frac{M}{2}(2\pi f_{tz})^2 - k_r,$$

where $k_{tz}$=stiffness of the support flexures 18 in the direction along a diameter of the inertial ring
$k_r$=stiffness of the support flexures 18 in the direction tangent to the inertial ring from Equation 2
$f_{tz}$=translational frequency to suppress, typically 20 to 40 Hz
M=Mass of the inertial ring Referring now to FIG. 8, in order to suppress a lateral vibration transmitted to the steering wheel rim 12 that deflects the steering wheel rim 12 in a lateral direction indicated by arrows 88, the stiffness of the support flexures 18 must be equal to a value defined by the following equation:

$$k_{ty} = \frac{M}{2}(2\pi f_{ty})^2 - k_r,$$

where $k_{ty}$=stiffness of the support flexures 18 in the direction along a diameter of the inertial ring
$k_r$=stiffness of the support flexures 18 in the direction tangent to the inertial ring from Equation 2
$f_{ty}$=translational frequency to suppress, typically 20 to 40 Hz
M=Mass of the inertial ring Referring now to FIG. 9, in order to suppress a fore and aft vibration transmitted to the steering wheel rim 12 that deflects the steering wheel rim 12 in a fore and aft direction indicated by arrows 90, the stiffness of the support flexures 18 must be equal to a value defined by the following equation:

$$k_p = \frac{M}{4}(2\pi f_p)^2,$$

where $k_p$=stiffness of the support flexures 18 in the direction perpendicular to the plane of the inertial ring
$f_p$=translational frequency to suppress
M=Mass of the inertial ring Referring now to FIG. 10, in order to suppress an out of plane vibration transmitted to the steering wheel rim 12 that deflects the steering wheel rim 12 in an out of plane direction indicated by arrows 92, from a location shown at 12 to a location shown by imaginary lines at 12, the stiffness of the support flexures 18 must be equal to a value defined by the following equation:

$$k_d = \frac{1}{2} I_d \left(\frac{2\pi f_d}{R_d}\right)^2,$$

where $k_d$=stiffness of the support flexures 18 in the direction pependicular to the inertial ring
$f_d$=translational frequency to suppress
$I_d$=Polar inertia of the inertial ring about a diameter (4)

$R_d$=Radius at which the support flexures act $$I_d = M\left(\frac{R_o^2 + R_i^2}{4} + \frac{T^2}{12}\right),$$

$I_d$=Polar inertia of the inertial ring about a diameter
M=Mass of the inertial ring
$R_o$=Outer diameter of the inertial ring
$R_i$=Inner diameter of the inertial ring
T=Thickness of the inertial ring Other uses of the above equations can accommodate various combinations of stiffness properties along with specific dynamic suppression of only limited directions or types of vibration. For instance, it is possible to design the absorber assembly 14 to achieve properties of dynamic suppression for only one of the above vibrations, while simultaneously assuring that all other dynamically amplified vibratory motions exist at elevated frequencies and are therefore relatively insignificant to the occupant. For such applications, those skilled in the art recognize that the critical frequencies in many of the above equations are used as minima and the respective stiffnesses are designed accordingly. For this case, only the remaining vibratory motion features a frequency targeted for dynamic suppression.

Furthermore, application of similar relationships for other configurations of support flexures 18 and inertial rings 16 is possible and can be readily practiced by those skilled in the art using the above equations, their equivalents, and supplemental relationships for minor departures from the preferred embodiment.

Referring again to FIGS. 1–3, alternatively, the support flexures 18 have any shape that is advantageous to suppress either one or a combination of torsional or translational vibrations that is transmitted from the vehicle to the steering wheel. The inertial ring 16 has a mass value that is tuned to interact with the support flexures 18 in suppressing the torsional vibration transmitted to the steering wheel.

The tangential member 22 has opposed ends that preferably attach to members 23 projecting inwardly from the wall 13 of the rim 12. An upper end of the radial member 20 attaches to the tangential member 22 intermediate the ends of the tangential member 22. A lower end of the radial member 20 attaches to an attachment point on the inertial ring 16. The inertial ring 16 can be shaped to distribute the mass of the absorber assembly 14 in order to tune the absorber assembly 14, such as by forming an indented portion 17, best seen in FIG. 3, or by including portions of the inertial ring 16 of larger width and greater mass (not shown) adjacent portions of the inertial ring 16 of smaller width and lesser mass (not shown). In an assembly for suppressing only torsional vibrations (not shown), the tangential members 22 are not needed and the inertial ring 16 is attached to the steering wheel rim 12 only by a plurality of radial members 20.

In operation, the support flexures 18 and the inertial ring 16 of the assembly 14 are tuned to suppress a predetermined motion transmitted to the steering wheel rim 12 by the vehicle. The inertial ring 16 acts as the mass in a tuned dynamic absorber system and the support flexures 18 act as the spring and damper in a tuned dynamic absorber system.

Figure 4:
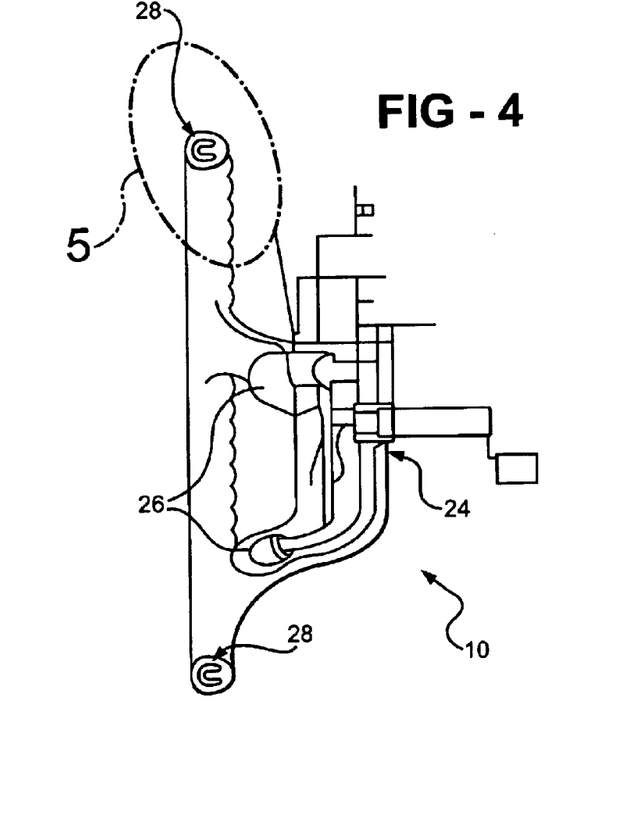
FIG. 4 is a cross-sectional view of a steering wheel including an absorber apparatus in accordance with the present invention.
Figure 5:
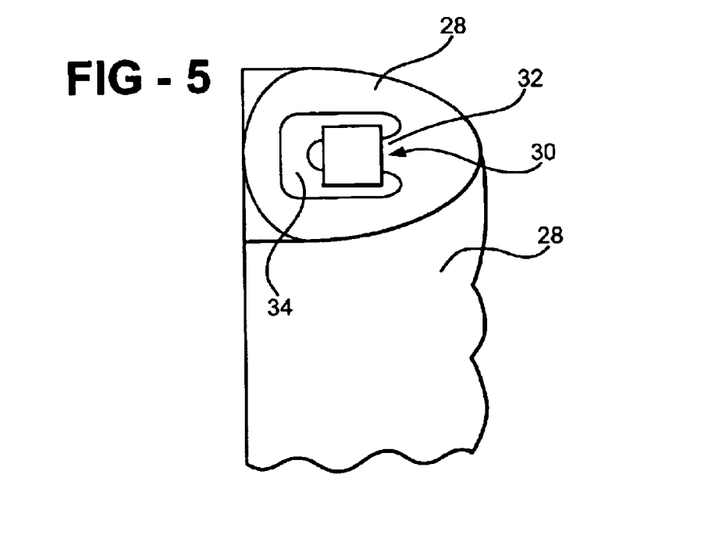
FIG. 5 is an enlarged view of the encircled portion 5 of FIG. 4.

Referring now to FIGS. 4, and 5, a steering wheel is indicated generally at 10. The steering wheel is operable to be mounted on a steering column (not shown) in a vehicle (not shown). The steering wheel 10 includes a hub 24 having a plurality of spokes 26 extending outwardly therefrom. A rim 28, such as the rim 12 of FIGS. 1–3, is attached to each of the spokes 26 and extends around the circumference of the hub 24. A block 30 schematically represents the location of the dynamic mass and the suspension elements, such as the inertial ring 16 and the support flexures 18 of the apparatus 14 of FIGS. 1–3 relative to the rim 28, and is attached to the rim 28 at an attachment point 32. The block 30 representing the inertial ring and the support flexures are positioned in a cavity 34 forming a hollow interior of the rim 28.

In operation, the support flexures and the inertial ring are tuned to suppress a predetermined motion transmitted to the steering wheel rim 28 by the vehicle. The inertial ring acts as the mass in a tuned dynamic absorber system and the suspension elements act as the springs and dampers in a tuned dynamic absorber system.

Figure 11:
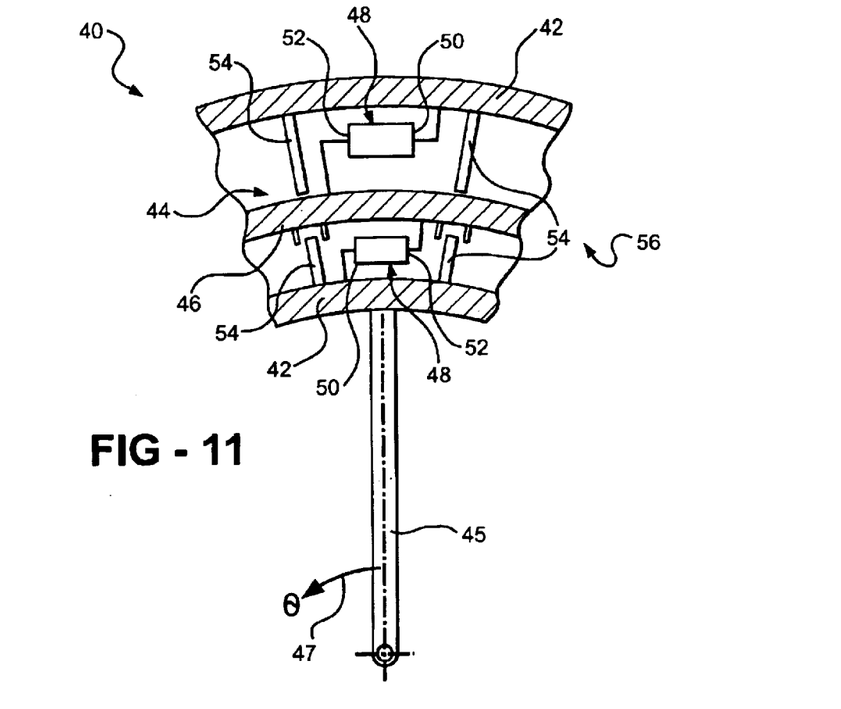
FIG. 11 is a fragmentary cross-sectional view of a steering wheel dynamic absorber assembly in accordance with the present invention.

Referring now to FIG. 11, a passive steering wheel dynamic absorber assembly is indicated generally at 40. The passive assembly 40 includes a generally toroidally-shaped steering wheel rim 42 having an annular cavity 44 formed therein. An inertial ring 46 is disposed in the annular cavity 44 and extends along the entire length of the annular cavity 44. Alternatively, the inertial ring 46 is a segmented ring (not shown) that includes a plurality of spaced apart inertial ring segments (not shown) along the length of the annular cavity 44. A plurality of inertial ring suspension elements 48 each having a first end 50 and a second end 52 are disposed in the annular cavity 44. The inertial ring suspension elements 48 are attached to the steering wheel rim 42 at their respective first ends 50 and to the inertial ring 46 at their respective second ends 52. A plurality of motion limiting members 54 having opposed ends are disposed in the annular cavity 44 and are attached to the steering wheel rim 42 adjacent the inertial ring suspension elements 48. The steering wheel rim 42 is attached to a spoke member 45 that extends from a hub (not shown) of a steering wheel (not shown). The inertial ring 46 and the inertial ring suspension elements 48 form a passive suppression means, indicated generally at 56. The spoke member 45 transmits a vibration in an angular velocity direction indicated by an arrow 47.

The passive suppression means 56 functions to suppress a vibration transmitted to the steering wheel rim 42 by developing neutralizing or counter-acting forces to those forces otherwise resulting in the vibration of the rim. Desirable neutralizing or counter-acting forces on the rim of the steering wheel may arise from a combination of spring-like and damper-like forces as relative movement occurs between the dynamic mass and the rim of the steering wheel. The passive suppression means 56 that provides an elastic or spring-like force can include, but is not limited to, plastic elements, elastomeric elements, magnetic elements, and pnuematic elements, such as a confined gas chamber. The passive suppression means 56 that produces damper-like forces can include, but is not limited to, plastic elements, elastomeric elements, electrical or magnetic elements, hydraulic or viscous elements, elements having relative sliding friction between the masses (coulomb), and pneumatic elements.

In the operation of the passive assembly 40, the inertial ring 46 is responsive to a vibration that is transmitted to the steering wheel rim 42. The passive suppression means 56 suppresses the vibration at a predetermined band of frequencies. The motion limiting members 54 restrict the relative movement of the inertial ring 46 with respect to the steering wheel rim 42 so as to avoid possible damage to the inertial ring suspension elements 48 caused by excessive relative displacements.

Figure 13A:
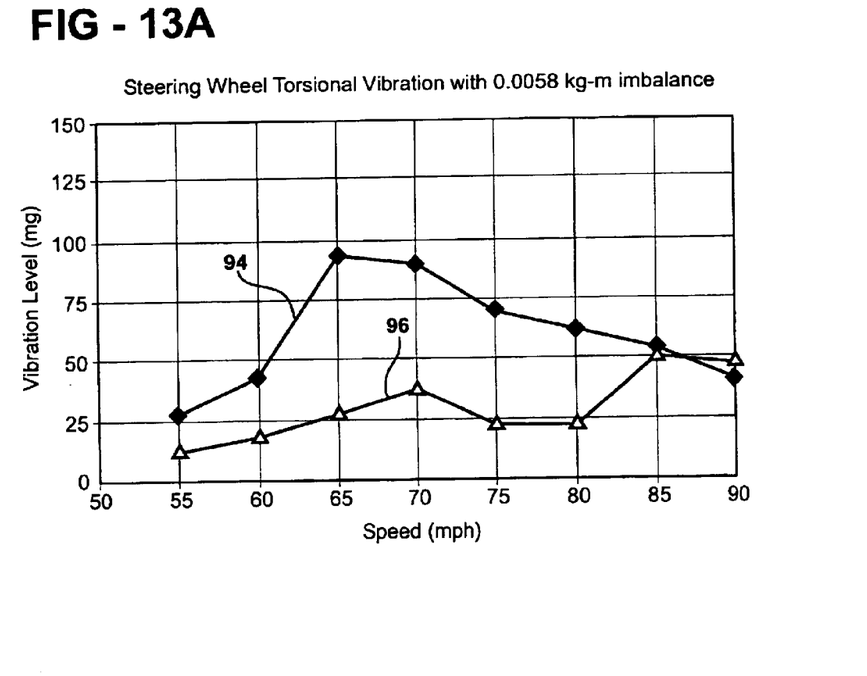
FIG. 13A is a graph depicting vibration levels at various speeds taken on a vehicle without and with an absorber assembly in accordance with the present invention.
Figure 13B:
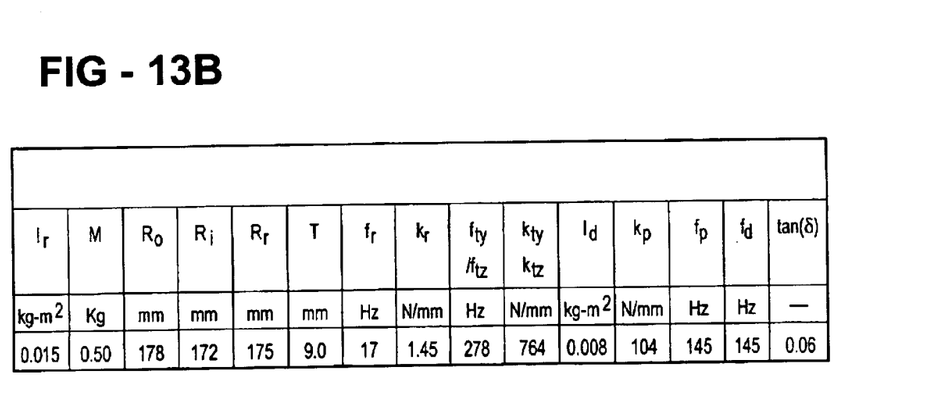
FIG. 13B is a table depicting design data for the dynamic absorber assembly used in the results of FIG. 13A.

Damping of the absorber assembly 14 or 40 must accommodate the specific circumstances. Absorber assemblies 14 or 40 featuring structural damping producing the equivalent of approximately 3–5% of critical damping are very effective, as shown in FIGS. 13A and 13B, which illustrates sample on-road data taken from a vehicle (not shown). This damping is achieved by the selection of materials having a tan(δ) or loss tangent of approximately 0.06–0.10, as described in the publications "Shock and Vibration Handbook", Third Edition, by Cyril M. Harris and "Sound and Vibration Damping with Polymers", by Robert D. Corsaro and L. H. Sperling, incorporated herein by reference. The tan(δ) or loss tangent is defined as the loss modulus of the material divided by the storage modulus of the material, as is well known and appreciated by those skilled in the art. The line 94 shows vibration levels at various speeds taken on the vehicle without the absorber assembly 14 or 40 installed, and the line 96 shows vibration levels at various speeds taken on the vehicle with the absorber assembly 14 or 40 installed. The table of FIG. 13B summarizes design criteria for the vehicle data of FIG. 13A, line 96. This particular absorber assembly employed a simple steel rim 12 or 28 with four support flexures 18 or 32.

Figure 12:
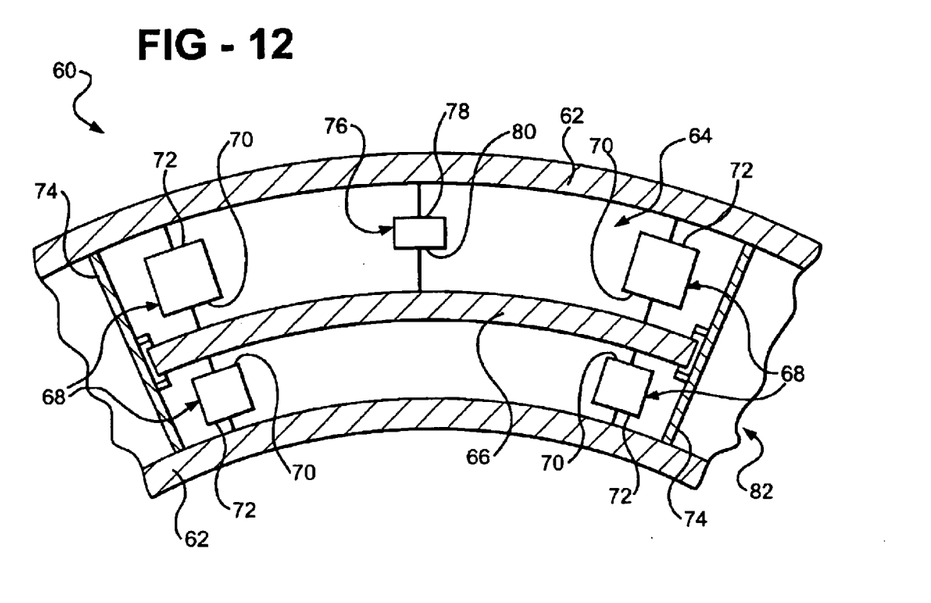
FIG. 12 is a fragmentary cross-sectional view of an alternative embodiment of a steering wheel dynamic absorber assembly in accordance with the present invention.

Referring now to FIG. 12, an active steering wheel dynamic absorber assembly is indicated generally at 60. The active assembly 60 includes a generally toroidally-shaped steering wheel rim 62 having an annular cavity 64 formed therein. An inertial ring segment 66 is disposed in the annular cavity 64. Preferably, a plurality of inertial ring segments 66 (not shown) extend along the entire length of the annular cavity 64. Alternatively, the inertial ring segment 66 is a continuous inertial ring (not shown) that extends along the length of the annular cavity 64. A plurality of inertial ring segment suspension elements 68 having a first end 70 and a second end 72 are disposed in the annular cavity 64. The inertial ring segment suspension elements 68 are attached to the steering wheel rim 62 at their respective second ends 72 and to the inertial ring segment 66 at their respective first ends 70. A plurality of motion limiting members 74 having opposed ends are disposed in the annular cavity 64 and are attached to the steering wheel rim 62 adjacent the inertial ring segment suspension elements 68. An active suppression force element 76 having a first end 78 and a second end 80 is disposed in the annular cavity 64. The active suppression force element 76 is attached at the first end 78 to the steering wheel rim 62 and at the second end 80 to the inertial ring segment 66. The steering wheel rim 62 is attached to a spoke member (not shown) that extends from a hub (not shown) of a steering wheel (not shown). The inertial ring segment 66, the inertial ring segment suspension elements 68, and the active suppression force element 76 form an active suppression means, indicated generally at 82.

The active suppression means 82 has the capability to respond to a signal representing a vibration transmitted to the steering wheel rim 62 and the capability to develop an active suppression force in response to the measured steering wheel vibration. The active suppression means 82 can be an element that produces a force through an electromagnetic or a piezoelectric action, or a similar type action to reduce the measured steering wheel vibration.

In the operation of the active assembly 60, the inertial ring segment 66 is responsive to a vibration that is transmitted to the steering wheel rim 62. A steering wheel torque sensor (not shown) or an accelerometer (not shown) sense the vibration and pass a signal to a control means (not shown). The control means activates the active suppression means 82. The active suppression means 82 suppresses the vibration at a predetermined band of frequencies by providing a sufficiently active suppression force in response to the signal from the steering wheel torque sensor or the accelerometer. The motion limiting members 74 restrict the relative movement of the inertial ring segment 66 with respect to the steering wheel rim 62 to avoid damage to the suspension elements 68 caused by excessive relative displacements.

In accordance with the provisions of the patent statutes, the present invention has been described in what is considered to represent its preferred embodiment. However, it should be noted that the invention can be practiced otherwise than as specifically illustrated and described without departing from its spirit or scope. In particular, referring to FIGS. 1–5, while the support flexures 18 have been shown as generally T-shaped, those skilled in the art will realize that a number of embodiments of the support flexures 18 can be utilized to attach the inertial ring 16 to the steering wheel rim 12, all while remaining within the scope of the invention.

What is claimed is:

1. An assembly operable to be used with a steering wheel rim of a vehicle and to suppress a vibration transmitted to the steering wheel rim during operation of the vehicle, the steering wheel rim having an annular cavity formed therein, comprising:
  at least a pair of members projecting inwardly from said steering wheel rim;
  a mass adapted to be received in the annular cavity and operable to move in response to the vibration transmitted to the steering wheel rim;
  a plurality of suspension elements having opposed ends, said suspension elements located intermediate said rim and said mass and attached at one end to the at least a pair of members and at another end to said mass, said mass and said suspension elements forming a suppression means; and
  whereby when the vibration is transmitted to the steering wheel rim and moves said mass relative to the steering wheel rim, said suppression means produces a suppression force at a predetermined band of frequencies to suppress the vibration of the steering wheel rim.

2. An assembly operable to be used with a steering wheel rim of a vehicle and to suppress a vibration transmitted to the steering wheel rim during operation of the vehicle, the steering wheel rim having an annular cavity formed therein, comprising:
  an inertial ring adapted to be received in the annular cavity and operable to move in response to the vibration transmitted to the steering wheel rim;
  plurality of T-shaped support flexures adapted to be located intermediate said steering wheel rim and said inertial ring and including a tangential member projecting inwardly from and adapted to be attached to said steering wheel rim and a radial member attached at one end to said tangential member and at an opposed end to said inertial ring, said inertial ring and said support flexures forming a suppression means tuned to a predetermined band of frequencies to suppress the vibration transmitted to the steering wheel rim; and
  whereby when the vibration is transmitted to the steering wheel rim and moves said inertial ring relative to the steering wheel rim said suppression means produces a suppression force at the predetermined band of frequencies to suppress the vibration of the steering wheel rim.

3. The apparatus according to claim 2 wherein each of said support flexures is a plastic flexure.

4. The apparatus according to claim 2 wherein said support flexures and said inertial ring are operable to suppress a one of a torsional vibration and a translational vibration.

5. The apparatus according to claim 2 wherein said support flexures and said inertial ring are operable to suppress each of a torsional vibration and a translational vibration.

6. The apparatus according to claim 2 wherein each of said support flexures is an elastomeric flexure.

7. The apparatus according to claim 2 wherein each of said support flexures is a metallic flexure.

8. The apparatus according to claim 2 wherein each of said support flexures is a composite flexure.

9. An apparatus for suppressing a vibration transmitted to a steering wheel, the steering wheel including a hub and a steering wheel rim connected to the hub by a plurality of spokes and extending around the circumference of the hub, comprising:

said steering wheel rim having an annular cavity formed therein defining a wall that includes at least a pair of members projecting inwardly from said wall;

a plurality of support flexures attached to said at least a pair of members in said cavity of said steering wheel rim; and an inertial ring attached to said support flexures and positioned in said cavity radially spaced apart from said rim, whereby said support flexures and said inertial ring are tuned to suppress the vibration transmitted to the steering wheel at a predetermined band of frequencies.

10. The apparatus according to claim 9 wherein said support flexures and said inertial ring are operable to suppress a one of a torsional vibration and a translational vibration.

11. The apparatus according to claim 9 wherein said support flexures and said inertial ring are operable to suppress each of a torsional vibration and a translational vibration.

12. A steering wheel assembly operable to suppress a vibration transmitted thereto, comprising:

a steering wheel having a hub and rim, said rim attached to said hub by a plurality of spokes and extending around the circumference of the hub, said rim having an annular cavity formed therein;

a plurality of generally T-shaped support flexures attached to said rim in said cavity; and an inertial ring attached to said support flexures and positioned in said cavity, whereby said support flexures and said inertial ring are tuned to suppress a steering wheel vibration at a predetermined band of frequencies and said support flexures are adapted to produce effective neutralizing or counter-acting forces at said rim through interactions with said inertial ring and said rim.

13. The apparatus according to claim 12 including at least a pair of members projecting inwardly from said rim, said support flexures attached at one end to said at least a pair of members.

* * * * *